(12) United States Patent
Elmes et al.

(10) Patent No.: US 8,459,251 B2
(45) Date of Patent: Jun. 11, 2013

(54) SOLAR THERMAL UNIT

(75) Inventors: Stuart Anthony Elmes, Cambridgeshire (GB); Kok Thong Tan, Cambridgeshire (GB); Richard Burgess, Greater London (GB)

(73) Assignees: Viridian Concepts Limited, Cambridge (GB); Lonsdale Metal Company, London (GB)

( * ) Notice: Subject to any disclaimer, the term of this patent is extended or adjusted under 35 U.S.C. 154(b) by 606 days.

(21) Appl. No.: 12/600,982

(22) PCT Filed: May 21, 2008

(86) PCT No.: PCT/EP2008/056253
§ 371 (c)(1),
(2), (4) Date: Nov. 19, 2009

(87) PCT Pub. No.: WO2008/142105
PCT Pub. Date: Nov. 27, 2008

(65) Prior Publication Data
US 2010/0154787 A1    Jun. 24, 2010

(30) Foreign Application Priority Data
May 21, 2007   (GB) .................................. 0709735.5

(51) Int. Cl.
*F24J 2/46* (2006.01)
(52) U.S. Cl.
USPC .......... 126/704; 126/705; 126/621; 52/173.3; 52/475.1; 52/475.2

(58) Field of Classification Search
USPC ............. 126/704, 705, 621; 52/173.3, 475.1, 52/747.1, 745.2, 786.11
See application file for complete search history.

(56) References Cited

U.S. PATENT DOCUMENTS

| | | | | |
|---|---|---|---|---|
| 1,988,147 | A * | 1/1935 | Voigt ......................... | 52/506.09 |
| 3,334,463 | A * | 8/1967 | Muessel ......................... | 52/775 |
| 3,362,123 | A * | 1/1968 | Geyser ............................. | 52/773 |
| 3,512,819 | A * | 5/1970 | Gillingwater et al. .......... | 52/461 |
| 3,672,107 | A * | 6/1972 | Santry et al. .................... | 52/235 |
| 3,736,717 | A * | 6/1973 | Farley ............................. | 52/476 |
| 3,931,699 | A * | 1/1976 | Sarvay ............................. | 52/476 |
| 3,974,608 | A * | 8/1976 | Grearson ......................... | 52/235 |
| 4,055,923 | A * | 11/1977 | Biebuyck ......................... | 52/235 |
| 4,062,351 | A * | 12/1977 | Hastwell ......................... | 126/571 |
| 4,106,483 | A * | 8/1978 | Barber, Jr. ...................... | 126/605 |
| 4,108,155 | A * | 8/1978 | Koizumi et al. ............... | 126/621 |
| 4,112,918 | A * | 9/1978 | Palkes ............................ | 126/596 |
| 4,120,287 | A * | 10/1978 | Marles et al. ................. | 126/658 |
| 4,136,669 | A * | 1/1979 | Lane ............................. | 126/621 |

(Continued)

FOREIGN PATENT DOCUMENTS

| DE | 28 11 604 A1 | 9/1979 |
|---|---|---|
| DE | 195 16 839 A1 | 11/1996 |

(Continued)

*Primary Examiner* — Kenneth Rinehart
*Assistant Examiner* — Jorge Pereiro
(74) *Attorney, Agent, or Firm* — Sughrue Mion, PLLC

(57) ABSTRACT

A solar thermal unit adapted for fitting into one or more connectors designed for receiving one or more panes of glass (2), wherein said thermal solar unit includes a fluid circuit, a light-absorbing surface (3), and a housing for the light-absorbing surface (3) and fluid circuit, which housing extends to the rear and sides of the light-absorbing surface.

18 Claims, 2 Drawing Sheets

U.S. PATENT DOCUMENTS

Figure 1:
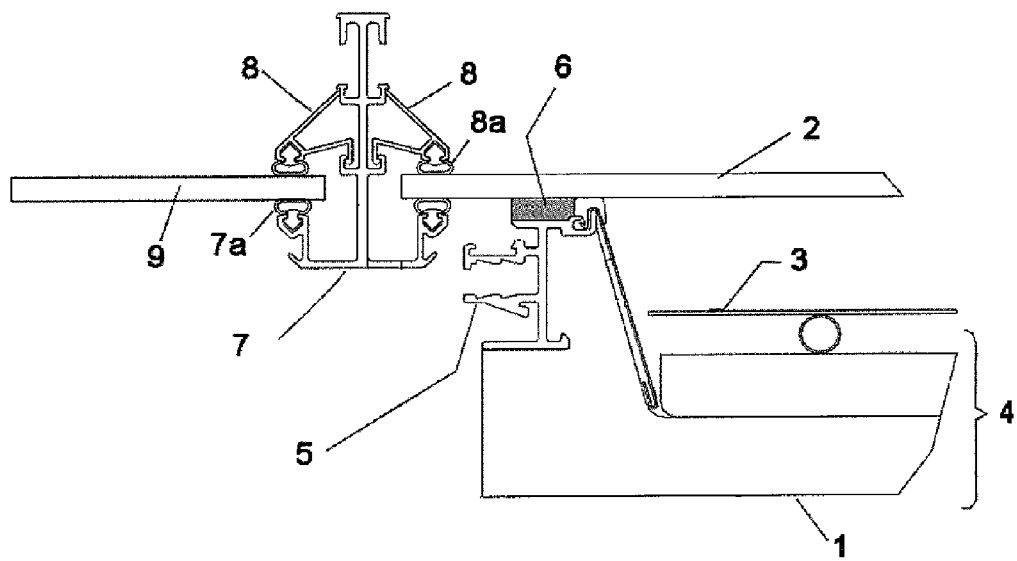

| | | | |
|---|---|---|---|
| 4,141,339 A * | 2/1979 | Weinstein | 126/621 |
| 4,170,983 A * | 10/1979 | Sadler | 126/712 |
| 4,215,677 A * | 8/1980 | Erickson | 126/621 |
| 4,223,667 A * | 9/1980 | Paymal | 126/621 |
| 4,228,791 A | 10/1980 | Hirai et al. | |
| 4,233,962 A * | 11/1980 | Neny | 126/662 |
| 4,244,355 A * | 1/1981 | Stout | 126/622 |
| 4,249,519 A | 2/1981 | Martinez | |
| 4,278,074 A * | 7/1981 | Uroshevich | 126/666 |
| 4,289,113 A * | 9/1981 | Whittemore | 126/570 |
| 4,296,742 A * | 10/1981 | Hussmann | 126/670 |
| 4,378,789 A * | 4/1983 | Vironneau | 126/654 |
| 4,387,542 A * | 6/1983 | Wehr | 52/209 |
| 4,409,960 A | 10/1983 | Balzer | |
| 4,412,528 A | 11/1983 | Elzinga, Jr. | |
| 4,471,764 A * | 9/1984 | Calvert et al. | 126/704 |
| 4,483,122 A * | 11/1984 | Crandell | 52/747.1 |
| 4,545,364 A * | 10/1985 | Maloney | 126/618 |
| 4,631,884 A * | 12/1986 | Reynolds | 52/235 |
| 4,650,702 A * | 3/1987 | Whitmyer | 428/31 |
| 4,672,784 A * | 6/1987 | Pohlar | 52/235 |
| 4,707,959 A * | 11/1987 | Stoakes | 52/235 |
| 4,738,065 A * | 4/1988 | Crandell | 52/235 |
| 4,750,310 A * | 6/1988 | Holcombe | 52/844 |
| 4,813,203 A * | 3/1989 | Newman et al. | 52/208 |
| 4,887,402 A * | 12/1989 | Da Col | 52/235 |
| 4,896,473 A * | 1/1990 | Liebetrau | 52/748.11 |
| 4,905,435 A * | 3/1990 | Horst | 52/235 |
| 5,018,326 A * | 5/1991 | Reynolds | 52/235 |
| 5,094,051 A * | 3/1992 | Miller | 52/235 |
| 5,355,645 A * | 10/1994 | Farag | 52/235 |
| 5,381,637 A * | 1/1995 | Farag | 52/204.595 |
| 5,579,616 A * | 12/1996 | Farag | 52/235 |
| 5,713,167 A * | 2/1998 | Durham et al. | 52/204.54 |
| 5,960,790 A * | 10/1999 | Rich | 126/623 |
| 6,105,317 A * | 8/2000 | Tomiuchi et al. | 52/173.3 |
| 6,119,683 A * | 9/2000 | Nakauchi | 126/652 |
| 6,578,340 B2 * | 6/2003 | Ishikawa et al. | 52/654.1 |
| 6,784,360 B2 * | 8/2004 | Nakajima et al. | 136/251 |
| 7,533,501 B2 * | 5/2009 | Neal | 52/204.54 |
| 7,810,491 B2 * | 10/2010 | Benvenuti | 126/653 |
| 2002/0020121 A1 * | 2/2002 | Ishikawa et al. | 52/127.2 |
| 2003/0226320 A1 * | 12/2003 | Engebretson | 52/204.5 |
| 2003/0226324 A1 * | 12/2003 | Hogan | 52/235 |
| 2004/0011354 A1 * | 1/2004 | Erling | 126/621 |
| 2004/0099778 A1 * | 5/2004 | Hogan | 248/261 |
| 2004/0123550 A1 * | 7/2004 | Hartman | 52/720.1 |
| 2004/0221524 A1 * | 11/2004 | Poddany et al. | 52/204.5 |
| 2005/0241633 A1 * | 11/2005 | Nikiforov et al. | 126/628 |
| 2006/0086382 A1 * | 4/2006 | Plaisted | 136/244 |
| 2006/0286317 A1 * | 12/2006 | Berkowitz | 428/34 |
| 2007/0039611 A1 * | 2/2007 | Benvenuti | 126/652 |
| 2007/0084460 A1 * | 4/2007 | Beckman | 126/625 |
| 2008/0047548 A1 * | 2/2008 | Konietzny et al. | 126/709 |
| 2008/0198584 A1 * | 8/2008 | Fouraux et al. | 362/147 |
| 2009/0114209 A1 * | 5/2009 | Moller et al. | 126/569 |

FOREIGN PATENT DOCUMENTS

| | | |
|---|---|---|
| DE | 19837161 A1 * | 2/2000 |
| DE | 20111962 U1 * | 10/2001 |
| DE | 201 18 311 U1 | 4/2002 |
| DE | 202 19 221 U1 | 2/2003 |
| EP | 0 044 256 A1 | 1/1982 |
| GB | 2 049 158 A | 12/1980 |
| JP | 57-192743 A | 11/1982 |
| JP | 10072978 A * | 3/1998 |
| JP | 2004191401 A * | 7/2004 |

* cited by examiner

SOLAR THERMAL UNIT

The present invention relates to a technique for integrating the installation of a solar thermal unit, such as a solar water heating device, into conventional building design, in particular into edge-supported patent glazing, curtain walling, window and conservatory systems.

It is known to integrate photovoltaic solar panels into such conventional glazing systems, since the silicon wafers from which they are made are extremely thin and can be encapsulated between glass sheets to make a glazing pane of similar overall thickness to a conventional glass pane.

Solar thermal panels trap heat by means of a dark surface that absorbs light behind a glazed cover. For optimal thermal performance, an air gap of greater than 10 mm is required above the heat capturing surface, minimising heat loss back to the environment by conduction through the air to the glass cover above. In addition, heat losses from the side and rear of the solar panel are reduced by thicknesses of thermal insulating materials. The overall thickness of a so-called flat plate solar panel such as that described above is generally in the range of 80-140 mm.

It is an aim of the invention to provide a new design of a pre-assembled solar thermal panel cassette system that is adapted for straightforward integration into conventional glazing systems such as those previously mentioned.

The present invention provides a solar thermal unit adapted for fitting into one or more connectors designed for receiving one or more panes of glass, wherein said thermal solar unit includes a fluid circuit, a light-absorbing surface, and a housing for the light-absorbing surface and fluid circuit, which housing extends to the rear and sides of the light-absorbing surface.

In one embodiment, the solar thermal unit is adapted for mounting on at least a pair of opposing glazing bars designed for receiving one or more panes of glass.

In one embodiment, the solar thermal unit includes a cover secured over said housing, wherein the cover is configured such that the housing and cover can be inserted together into an opening defined by at least a pair of glazing bars to a position where a surface of the cover contacts each of said glazing bars; and the cover and the housing together form a cassette for inserting into said opening defined by at least a pair of glazing bars to said position where a surface of the cover contacts each of said glazing bars; the cover is a planar cover, and the housing is configured relative to the cover such that it does not impede the insertion of the solar thermal unit into said opening defined by at least a pair of glazing bars in a direction substantially perpendicular to the plane of the cover.

In one embodiment, the solar thermal unit includes a cover secured over said housing, and said cover projects beyond at least one side edge of the housing.

In one embodiment, the solar thermal unit includes at least one side edge an edging strip having a thickness selected to complement a connector designed for receiving one or more panes of glass; and the edging strip is constituted by an edge portion of a cover of the thermal solar unit having a thickness selected to complement said connector.

In one embodiment, the solar thermal unit includes a cover that is locally increased in thickness at least one edge thereof so as to complement a connector designed for receiving one or more panes of glass; and the cover includes a pane of glass with a spacer bar provided at said at least one edge thereof, wherein the combined thickness of the cover and the spacer bar complements a connector designed for receiving one or more panes of glass.

In one embodiment, the solar thermal unit includes a cover and a connector component for providing beyond the edge of the cover a projecting structure having a thickness selected to complement a connector designed for receiving one or more panes of glass; and said cover is secured over said housing, and the connector component is configured such that the housing, cover and connector component can be inserted together into an opening defined by at least a pair of glazing bars to a position where a surface of the projecting structure contacts each of said glazing bars; and the cover, the housing and the connector component together form a cassette for inserting into said opening defined by at least a pair of glazing bars to said position where a surface of the projecting structure contacts each of said glazing bars; and the cover is a planar cover, and the housing is configured relative to the cover such that it does not impede the insertion of the solar thermal unit into said opening defined by at least a pair of glazing bars in a direction substantially perpendicular to the plane of the cover.

In one embodiment, the solar thermal unit includes a cover and a connector component for providing beyond the edge of the cover a projecting structure having a thickness selected to complement a connector designed for receiving one or more panes of glass; and said fluid circuit and said cover is secured over said housing, and said projecting structure projects beyond at least one side edge of the housing.

In one embodiment, the solar thermal unit includes a cover provided over said housing, and the solar thermal unit further includes a structure secured to the housing other than via the cover and which in combination with the cover provides a male connector that complements a female connector designed for receiving one or more panes of glass.

In one embodiment, said opening is defined by a frame comprising four glazing bars.

In one embodiment, the housing includes an insulation layer to the rear of the light-absorbing surface that thermally insulates said light-absorbing surface from each of said one or more connectors into which the solar thermal unit is adapted to be fitted.

The present invention also provides a method of installing a solar thermal unit as described above, the method including using a connector designed for receiving one or more panes of glass to support the solar thermal unit.

In one embodiment, the method includes providing a pair of integrated connectors each designed for receiving one or more panes of glass, using one of said connectors to support one or more panes of glass, and using the other of said connectors to support a thermal solar unit. In one embodiment, the method includes mounting the solar thermal unit on at least a pair of glazing bars designed for receiving one or more panes of glass; the solar thermal unit includes a cover secured over said housing, and the method includes the step of inserting the housing and cover together into an opening defined by at least a pair of glazing bars to a position where a surface of the cover contacts each of said glazing bars; the cover and the housing together form a cassette, and the method includes inserting said cassette into said opening defined by at least a contacts each of said glazing bars; the cover is a planar cover, and the method includes inserting the solar thermal unit into said opening defined by at least a pair of glazing bars in a direction substantially perpendicular to the plane of the cover; and said opening is defined by a frame comprising four glazing bars.

Hereunder follows a detailed description of embodiments of the invention, by way of example only, with reference to the accompanying drawings, in which:

FIGS. 1-4 are cross-sectional views of an edge of a solar thermal panel adapted for integration into conventional glazing systems.

In one embodiment of the invention, shown in cross-section in FIG. 1, the solar panel (1) has a light-absorbing surface (3) behind a transparent cover (2). A housing including insulation layers (4) reduces heat losses from the side and rear of the light-absorbing surface (3). The panel is framed by an edging bar (5) which is joined to the cover (2) by means of an adhesive such as a two-part silicone (6). The cover (2) has projected area greater than the solar panel, such that the glass protrudes beyond the sides of the solar panel.

This feature allows the solar panel to be directly assembled into a conventional glazing system such as a patent glazing bar (7) or in the case of a window or curtain walling system a mullion or transom before it is secured by means of a bead or capping (8). Rubber gaskets (7a, 8a) are part of the connector (7, 8, 7a, 8a) designed for directly receiving one or more panes of glass and create a weather-tight closure. The housing serves to thermally insulate the light-absorbing surface (3) from the connector (7, 8, 7a, 8a).

It can be seen that the advantage of this design is that the glazing of the solar panel (2) is coplanar with the conventional adjacent glazing (9), to create an integrated aesthetic for the building. A further advantage is that the solar panel can be installed by glazing subcontractors at the same time the glazing system is installed. This results in a reduced overall cost for the installation. The installers need no new training to be able to install the solar panel, since it follows the conventional approach, i.e. it is adapted for fitting into connectors designed to directly receive one or more panes of glass in the same way as conventional glazing.

Figure 2:
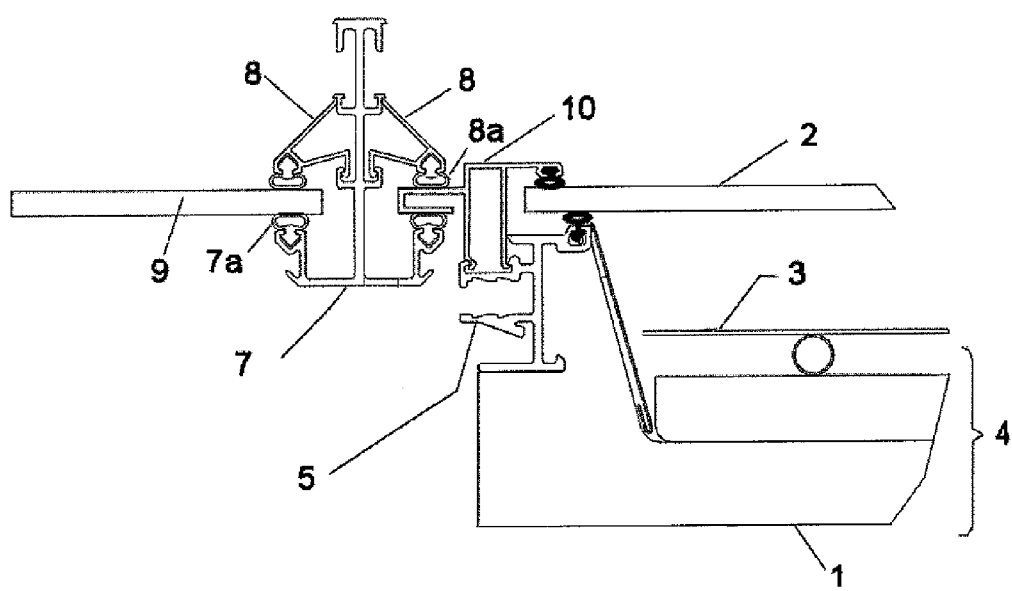

An alternative design is shown in FIG. 2. In this case, the cover (2) does not extend beyond the projected area of the solar panel, but a glazing trim (10) is modified to have a rib of equal thickness to the adjacent glass (9). The rib extends beyond the projected area of the solar panel and can be dropped onto the glazing bar (7) and secured by means of bead (8), where the glazing bar and bead and rubber gaskets (7a, 8a) constitute a connector designed for directly receiving one or more panes of glass.

Suitable materials for the transparent cover are glass and clear polymers such as polycarbonate and acrylic. Suitable materials for the adhesive are polyurethane and silicone. Suitable materials for the glazing bar and edging bar are timber, extruded aluminium, extruded polymers or rolled metals.

When the adjacent glass is formed from a double-glazed unit, the spacing between the glazing bar (7) and bead (8) is increased. The arrangement in FIG. 1 could be modified to suit this type of glazing bar with a double glazed cover glass on the solar panel. The arrangement in FIG. 2 could incorporate a rib of greater thickness to match the overall thickness of the adjacent double-glazed units.

Figure 3:
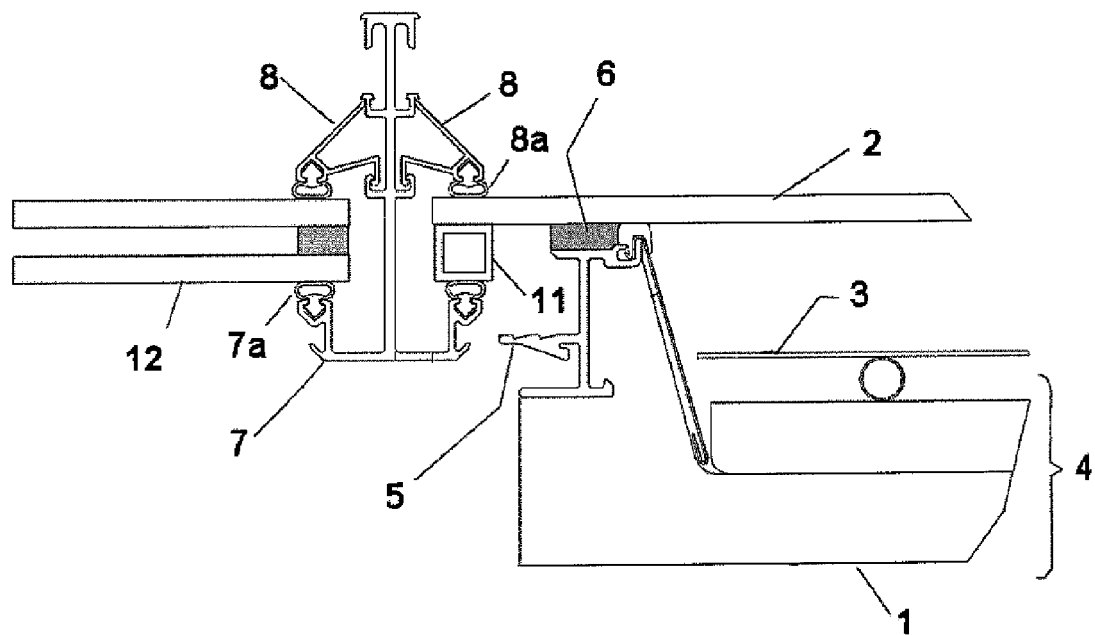
Figure 4:
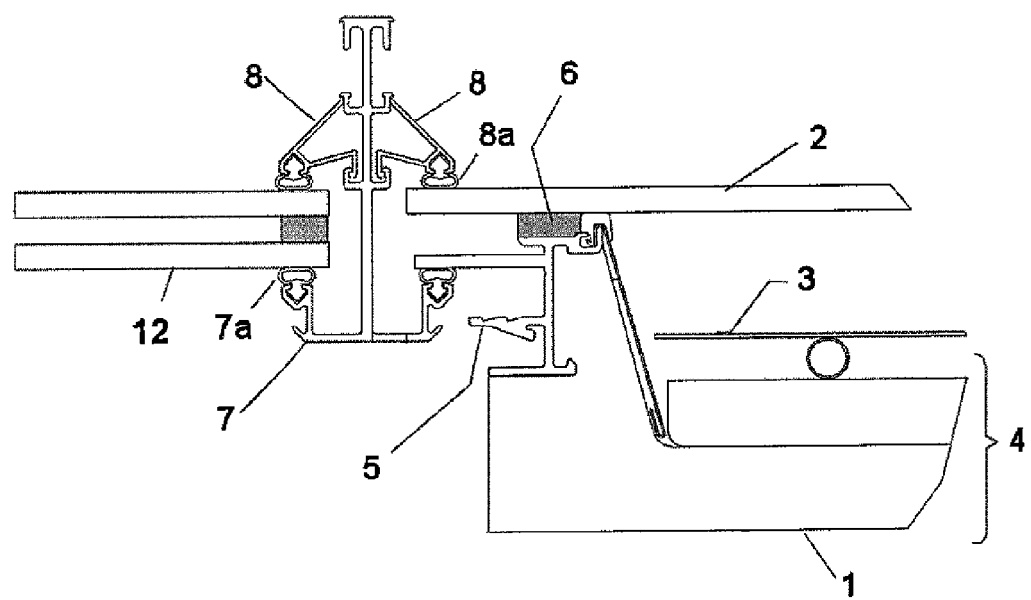

FIGS. 3 and 4 show further embodiments of the present invention that work in this situation.

In FIG. 3, the edge of the glass is modified with a spacer bar (11). The spacer bar is bonded to the glass and provides an overall thickness increase at the edge of the glass to match that of the adjacent double glazing (12).

In FIG. 4, the edging bar (5) is modified to provide a rib that is spaced apart from the cover glass (2) to provide an overall thickness that matches the adjacent double glazing (12) and can be held in the connector (7, 7a, 8, 8a) designed to directly receive double glazing 12.

The process of fitting the solar panel then follows the conventional way of fitting a pane of glass into a connector designed for directly receiving one or more panes of glass.

The glazing bars are assembled onto the structure of the building, spaced-apart to accommodate the size of the cover. The solar panel cassette is offered up into the gap between the glazing bars until the protruding edging strip formed from the cover or an extending rib is supported on the inner seal in the glazing bar. The clip-on or covers are then snapped into place, and the solar panel cassette is mounted. Plumbing connections can now be made from inside the building.

With the techniques described above, a standardised, factory produced solar panel can be used with construction industry standard glazing systems.

The above detailed description of embodiments of the present invention is provided by way of example only, and various modifications can be made to these embodiments without departing from the scope of the invention The applicant draws attention to the fact that the present invention may include any feature or combination of features disclosed herein either implicitly or explicitly or any generalisation thereof, without limitation to the scope of any definitions set out above.

The invention claimed is:

1. A solar thermal unit adapted for fitting into one or more connectors designed for receiving one or more panes of glass, wherein said thermal solar unit comprises:
 a fluid circuit;
 a light-absorbing surface; and
 a housing for the light-absorbing surface and fluid circuit, which housing extends to the rear and sides of the light-absorbing surface; and a cover secured over said housing;
 wherein said light-absorbing surface and said fluid circuit are spaced from said cover;
 wherein said housing includes insulation layers located at the side and rear of the light-absorbing surface;
 wherein said housing serves to thermally insulate the light-absorbing surface from said one or more connectors; and
 wherein the cover is configured such that the housing and cover can be inserted together into an opening defined by at least a pair of glazing bars to a position where a surface of the cover contacts each of said glazing bars.

2. The solar thermal unit according to claim 1, wherein the cover and the housing together form a cassette for inserting into said opening defined by at least a pair of glazing bars to said position where a surface of the cover contacts each of said glazing bars.

3. The solar thermal unit according to claim 1, wherein the cover is a planar cover, and the housing is configured relative to the cover such that it does not impede the insertion of the solar thermal unit into said opening defined by at least a pair of glazing bars in a direction substantially perpendicular to the plane of the cover.

4. The solar thermal unit according to claim 1, wherein said cover projects beyond at least one side edge of the housing.

5. The solar thermal unit according to claim 1, wherein the solar thermal unit includes at at least one side edge an edging strip having a thickness selected to complement said connector designed for receiving one or more panes of glass.

6. The solar thermal unit according to claim 5, wherein the edging strip is constituted by an edge portion of said cover having a thickness selected to complement said connector.

7. The solar thermal unit according to claim 1, wherein said cover—is locally increased in thickness at at least one edge thereof so as to complement said connector designed for receiving one or more panes of glass.

8. The solar thermal unit according to claim 7 wherein the cover includes a pane of glass with a spacer bar provided at said at least one edge thereof, and wherein the combined thickness of the cover and the spacer bar complements said connector designed for receiving one or more panes of glass.

9. The solar thermal unit according to claim 1, including a structure secured to the housing other than via the cover and which in combination with the cover provides a male connector that complements a female connector designed for receiving one or more panes of glass.

10. A method of installing a solar thermal unit, structured according to claim 1, the method comprising:
   using a connector designed for receiving one or more panes of glass to support the solar thermal unit;
   wherein the connector comprises at least a pair of glazing bars designed for receiving one or more panes of glass; and the method includes inserting the housing and cover together into an opening defined by said at least a pair of glazing bars to a position where a surface of the cover contacts each of said glazing bars.

11. The method according to claim 10, including providing a pair of integrated connectors each designed for receiving one or more panes of glass, using one of said connectors to support one or more panes of glass, and using the other of said connectors to support said thermal solar unit.

12. The method according to claim 10, wherein the cover and the housing together form a cassette, and including inserting said cassette into said opening defined by at least a pair of glazing bars to said position where a surface of the cover contacts each of said glazing bars.

13. The method according to claim 10, wherein the cover is a planar cover, and including inserting the solar thermal unit into said opening defined by at least a pair of glazing bars in a direction substantially perpendicular to the plane of the cover.

14. The method according to claim 10, wherein said opening is defined by a frame comprising four glazing bars.

15. The solar thermal unit according to claim 1, wherein said opening is defined by a frame comprising four glazing bars.

16. The solar thermal unit according to claim 1, wherein said light-absorbing surface is positioned between said fluid circuit and said cover.

17. The solar thermal unit according to claim 1, wherein said housing is joined to said cover by an adhesive.

18. A solar thermal unit adapted for fitting into one or more connectors designed for receiving one or more panes of glass, wherein said thermal solar unit comprises:
   a fluid circuit;
   a light-absorbing surface; and
   a housing for the light-absorbing surface and fluid circuit, which housing extends to the rear and sides of the light-absorbing surface; and a cover secured over said housing;
   wherein said light-absorbing surface and said fluid circuit are spaced from said cover;
   said housing includes insulation layers located at the side and rear of the light-absorbing surface;
   wherein said housing serves to thermally insulate the light-absorbing surface from said one or more connectors; and
   wherein the solar thermal unit includes at least one side edge an edging strip having a thickness selected to complement a connector designed for receiving one or more panes of glass, and the edging strip is constituted by an edge portion of said cover having a thickness selected to complement said connector.

* * * * *